July 28, 1953   R. E. SELTZER   2,646,745
BALING MACHINE
Filed March 24, 1949   5 Sheets-Sheet 1
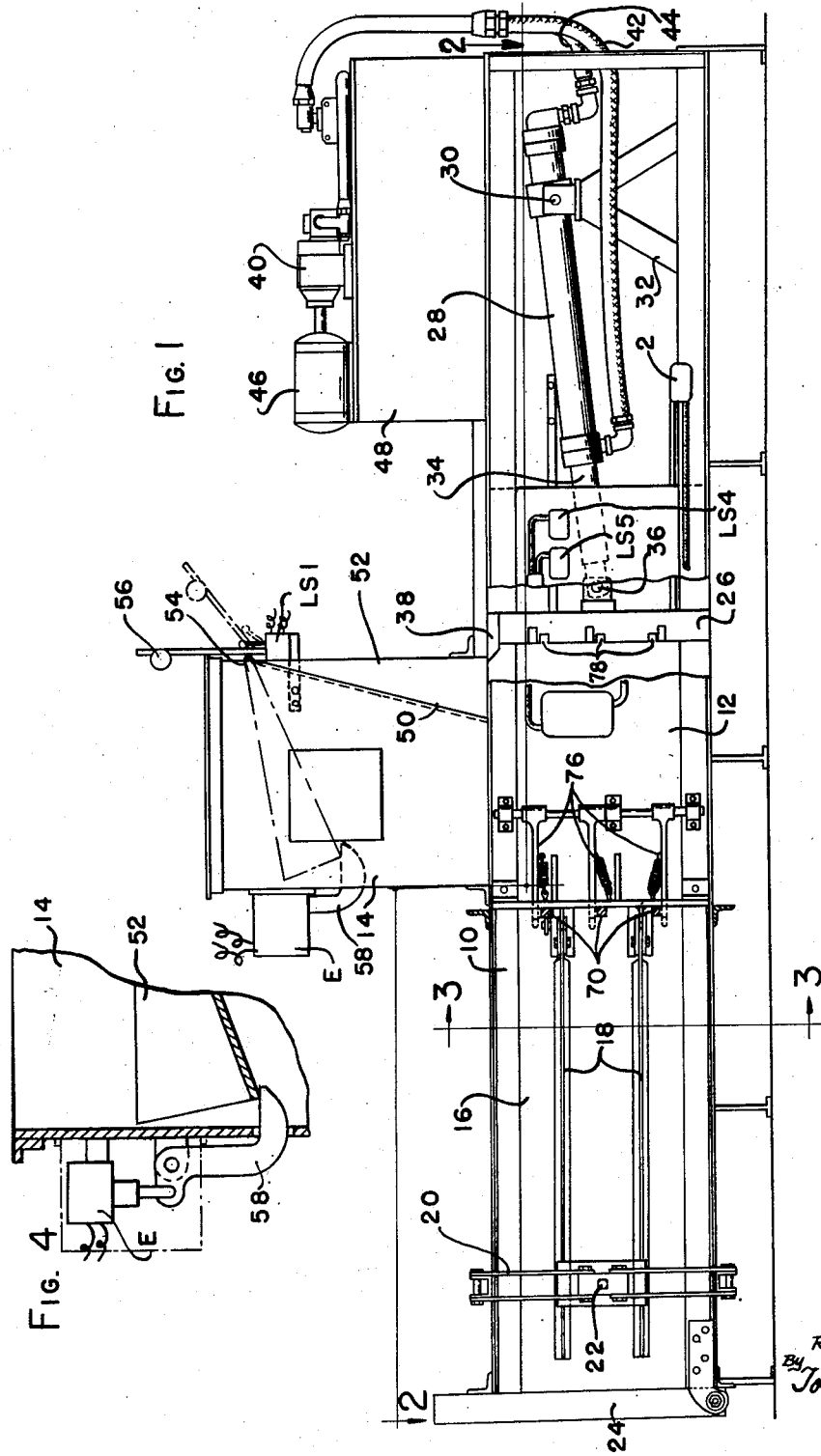
INVENTOR
ROBERT E. SELTZER
By Toulmin & Toulmin
ATTORNEYS July 28, 1953
R. E. SELTZER
2,646,745
BALING MACHINE
Filed March 24, 1949
5 Sheets-Sheet 2
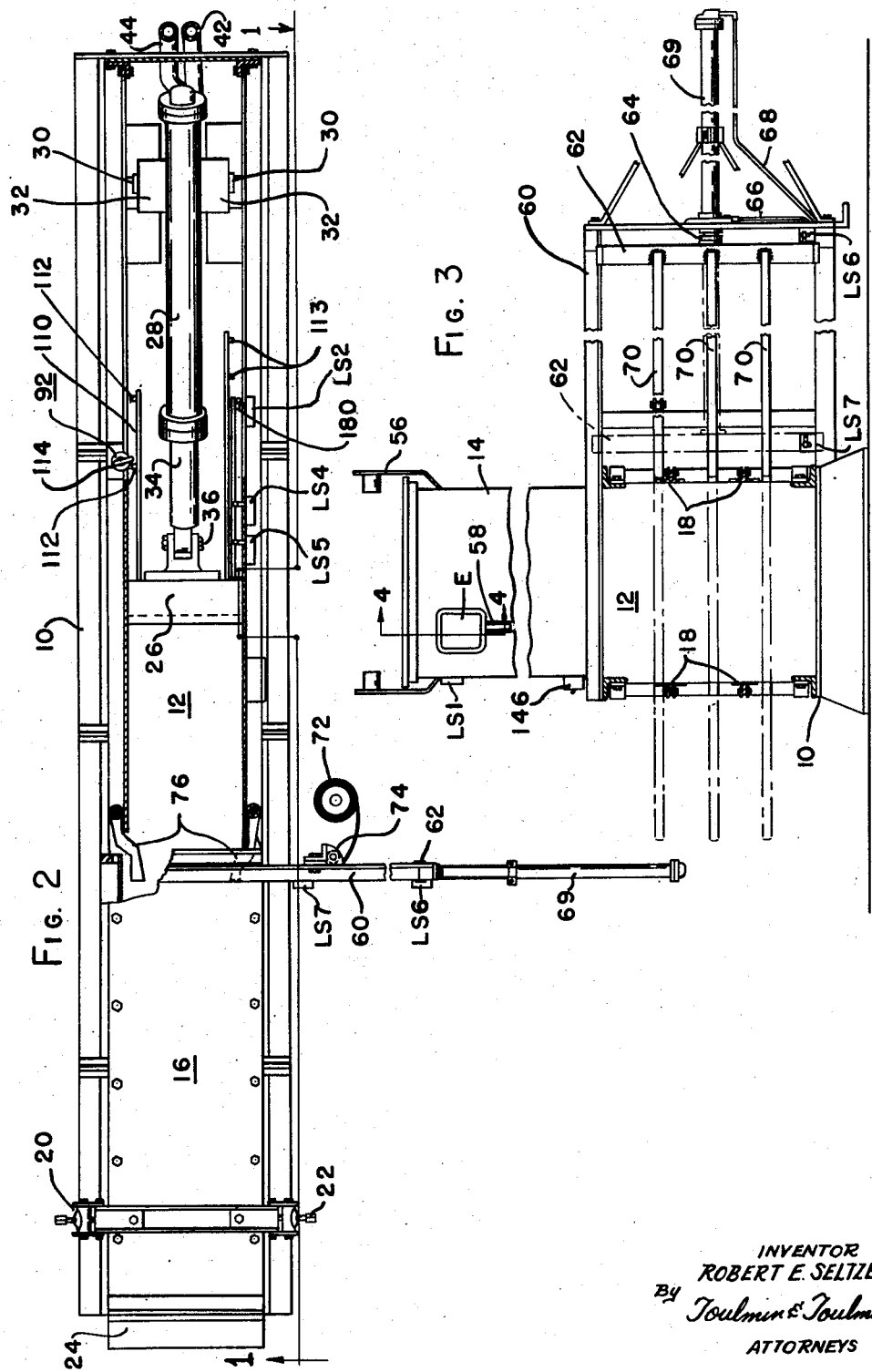
INVENTOR
ROBERT E. SELTZER
By Toulmin & Toulmin
ATTORNEYS

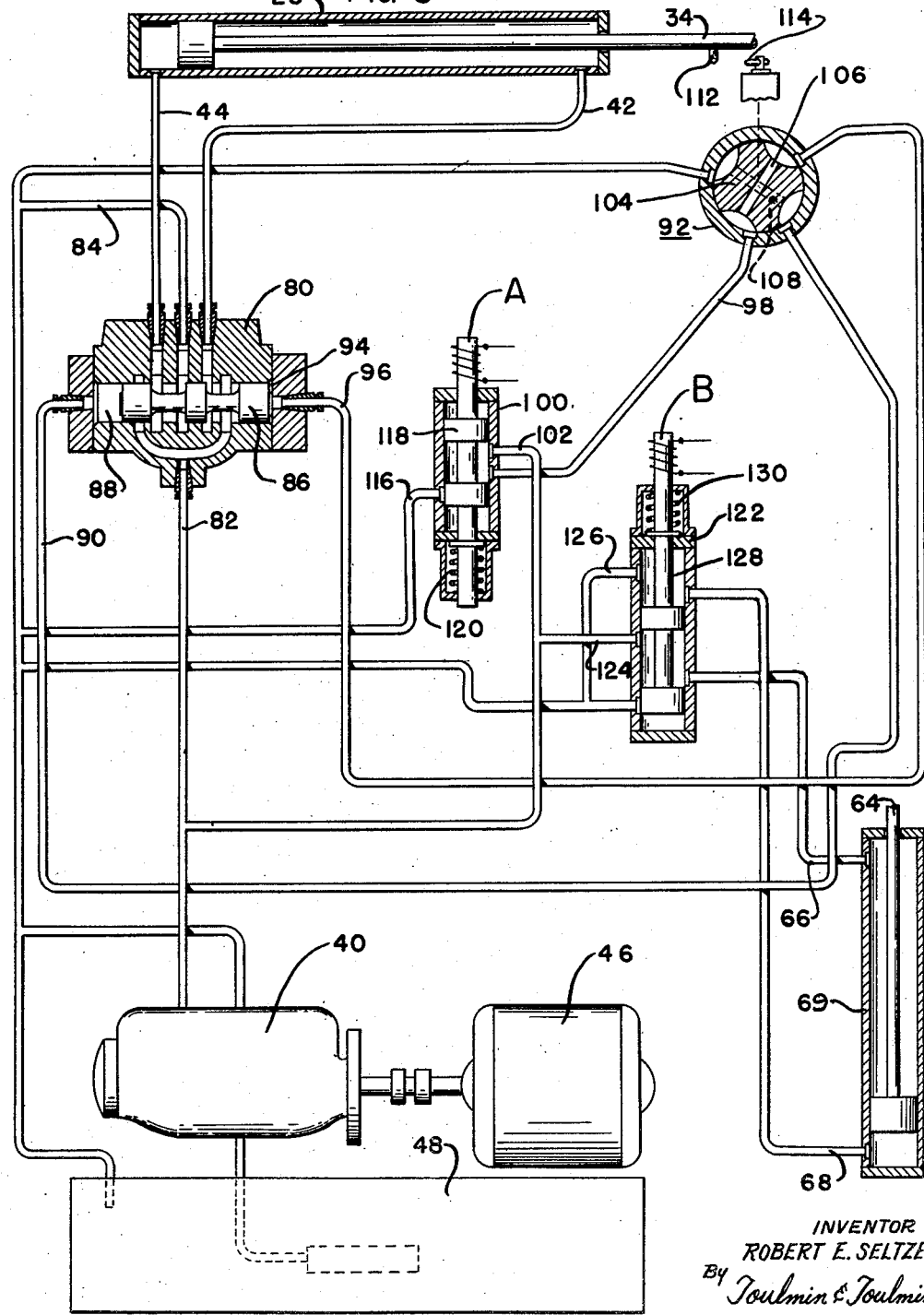

July 28, 1953  R. E. SELTZER  2,646,745
BALING MACHINE
Filed March 24, 1949  5 Sheets-Sheet 4
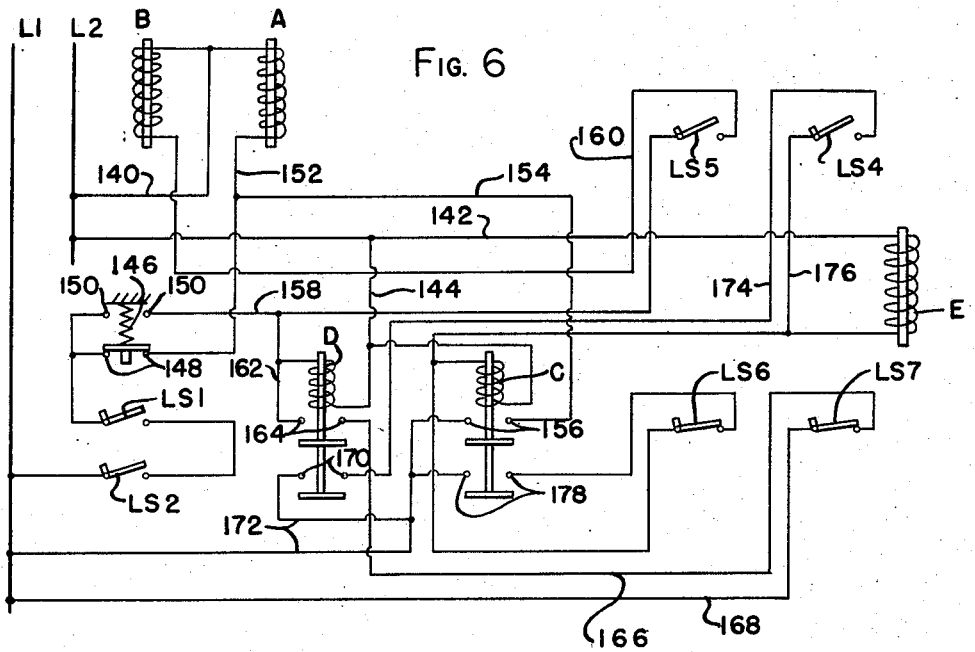
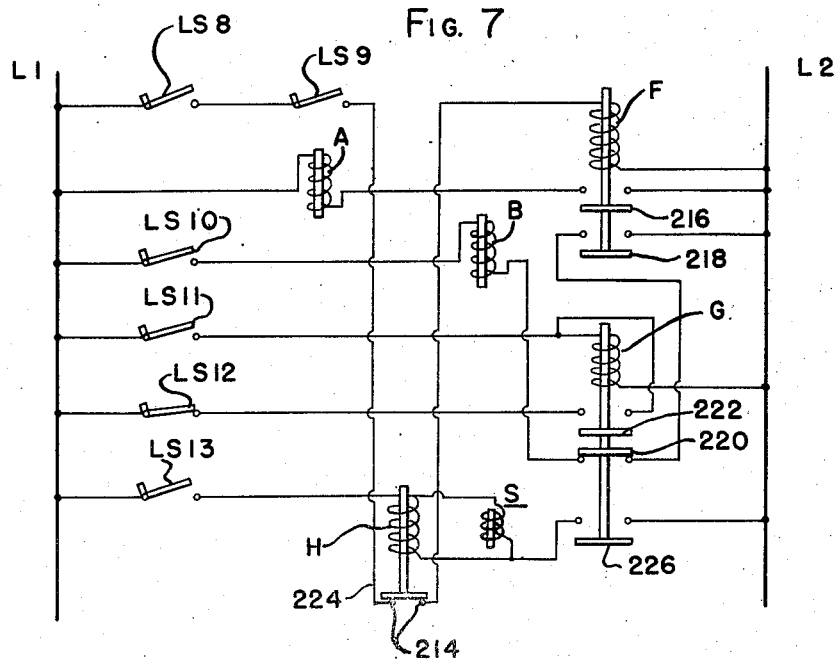
INVENTOR
ROBERT E. SELTZER
BY
Toulmin & Toulmin
ATTORNEYS

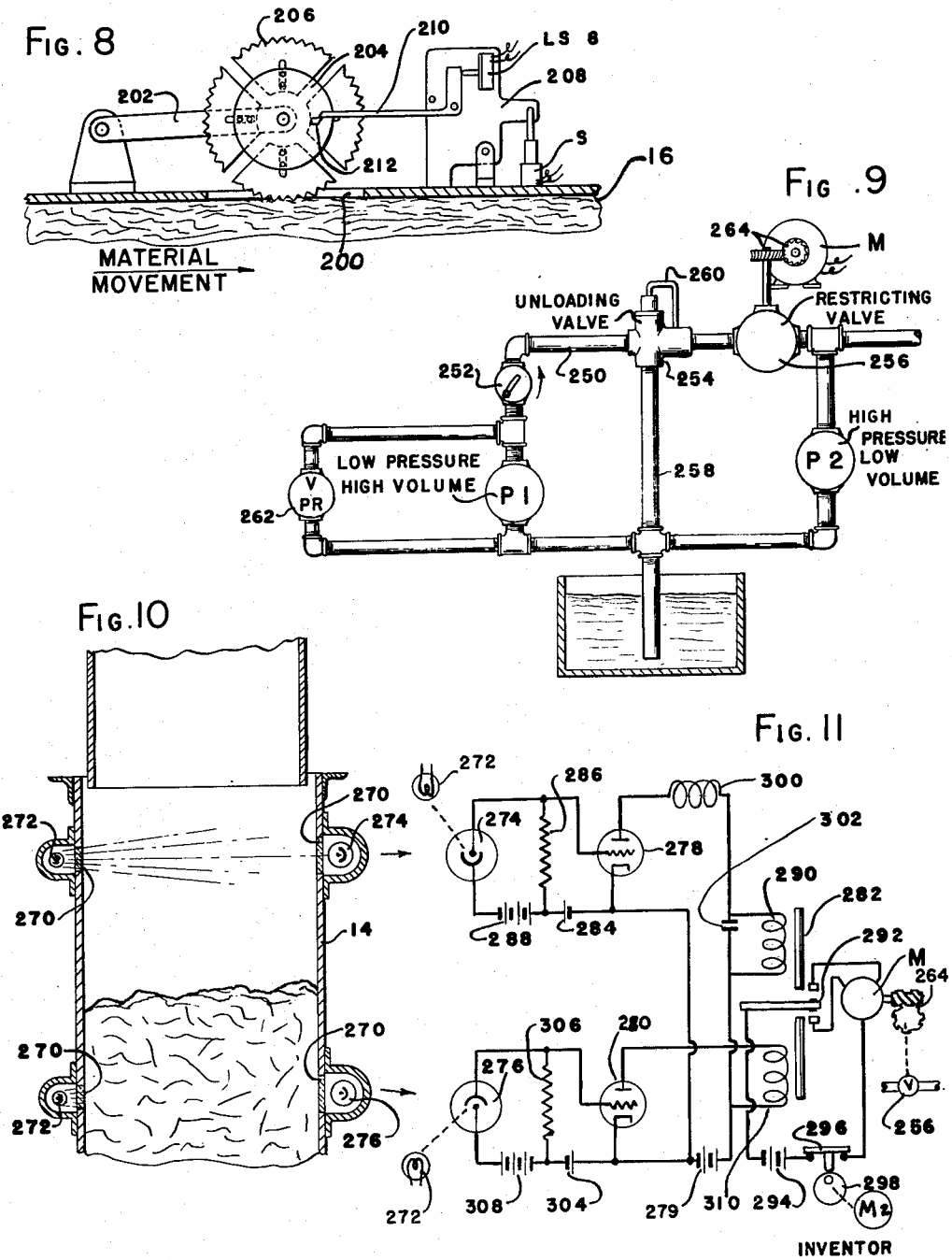

Patented July 28, 1953

2,646,745

UNITED STATES PATENT OFFICE 2,646,745

BALING MACHINE

Robert E. Seltzer, Bellevue, Ohio, assignor to The American Baler Company, Bellevue, Ohio, a corporation of Ohio Application March 24, 1949, Serial No. 83,211

4 Claims. (Cl. 100—53)

This invention relates to improvements in baling machines, and particularly to machines of this type adapted for continuous operation.

Baling machines as such are well-known and are utilized for baling waste papers, cotton waste, hay, rags, wood shavings, metal cuttings, and the like. Such baling machines include a baling plunger usually driven by means of a crank mechanism including a plurality of driven gears set to operate at a constant speed. The limitation imposed on the baler by causing it to operate at a fixed speed materially reduces the utility of the machine in connection with industrial processes, because it is impossible to adjust the speed of operation of the baler so that its consumption corresponds to the supply of material to be baled.

One of the primary objects of the present invention is to provide a baling machine which can be adjusted in speed so that it will exactly accommodate the flow of material thereto which is to be baled.

The driving mechanism referred to above, including the gears and the crank mechanism for operating the baling plunger, is expensive and cumbersome, and the operation thereof is often attended with considerable noise.

It is a still further object of this invention to provide means for hydraulically operating a baling press whereby gears, cranks, and the like, are eliminated from the machine.

A still further object is the provision of an improved automatic control circuit for a baling machine which positively controls the operation of the baler, especially at the time when a bale is to be tied, thereby eliminating hazard to the operator and materially reducing the chances that the machine itself will be damaged.

It is also an object of this invention to provide a novel control means for an automatic baling machine which automatically adjusts the speed of the machine to the flow of material thereto to be baled.

This invention also contemplates the provision of a power operated device for placing the tying bands about the bales being formed by the machine.

These and other objects and advantages will become more apparent upon reference to the following description taken in connection with the accompanying drawings in which:

Figure 1 is a side elevational view of a baling machine constructed according to my invention and with part of one of the side panels broken out to show the baling plunger:

Figure 2 is a view looking down on top of the baler and with the machine partly in section and is indicated by the line 2—2 on Figure 1:

Figure 3 is a transverse section indicated by the line 3—3 on Figure 1 and showing the arrangement of the band inserting mechanism;

Figure 4 is a fragmentary sectional view showing the latch means for supporting the door in the side of the hopper in its elevated position;

Figure 5 is a diagrammatic view of the circuit for driving the baling machine;

Figure 6 is a diagrammatic layout of one form of electric control circuit adapted for controlling the operation of the baling machine;

Figure 7 is another control circuit, somewhat similar to that of Figure 6, but adapted for operating the baler on a continuous cycle;

Figure 8 is a fragmentary view showing a measuring wheel adapted for measuring the lengths of the bales being made in the machine when it is operating on automatic cycling;

Figure 9 is a fragmentary view of a modified hydraulic control circuit for use when it is desired to adjust the speed of operation of the machine;

Figure 10 is a vertical section through the supply hopper of the machine showing a photocell arrangement adapted for use in connection with automatically controlling the speed of operation of the baler; and Figure 11 is a view of the control circuit in which the photocells of Figure 10 can be used for automatically effecting changes in speed of operation of the baling machine.

Referring to the drawings somewhat more in detail, and particularly to Figures 1 through 4, the baling machine of this invention comprises a frame, generally indicated at 10, and having a center compression chamber 12, which is open at the top for communication with the vertical hopper 14.

Extending leftwardly from the compression chamber 12, as the baler is viewed in Figure 1, is the baling chamber 16. The compression chamber and baling chamber are substantially conventional, and it will be understood that the material to be baled is pushed through the compression chamber 12 and into the baling chamber 16 to form the bales being made.

The baling chamber 16 is closed at the top and bottom, but is open at the sides except for the longitudinally extending and vertically spaced rails 18. Adjacent the exit end of the baling chamber, the rails 18 and the top and bottom plates of the baling chamber are connected by the well-known type of adjustable yoke mechanism 20, which can be adjusted by the adjusting screw 22 to predetermine the resistance offered to movement of the bales through the baling chamber, and thereby to determine the amount of compression of the material in the bales.

The exit end of the baling chamber may have hinged thereto a discharge platform 24 which can either be positioned horizontally to receive the ejected bales, or be positioned vertically, as in Figure 1, for forming a barrier against which the initial bale made in the machine can be built up.

Extending rightwardly, as viewed in Figure 1, from the compression chamber 12 are spaced guides which reciprocably support the baling head 26. The baling head is driven in reciprocation by a hydraulic motor which includes a cylinder 28 pivoted adjacent one end as by the trunnions 30 to a bracket 32 fixed in the frame and having therein the reciprocable double-acting plunger 34 which is connected with the baling head as by the pivot 36.

If desired, the baling head may include a shear blade shown at 38 and which is adapted for cooperation with a similar shear blade (not shown) on the baling chamber side of the compression chamber so that each charge of material compressed by the baling head is severed from the material in the hopper.

The hydraulic pump for supplying fluid to the baling head driving motor is indicated at 40 and is connected through suitable valve means by the conduits 42 and 44 with opposite ends of the cylinder 28. The pump 40 is driven by a motor 46, and the pump, motor, and control valve may be mounted on the top of a reservoir 48 carried on the frame at its left-hand end.

A great many materials which are baled, such as cotton waste, are best provided with end boards for supporting the material within the bales at each end of the bale. Such boards are introduced into the compression chamber and are pushed by the baling head into the baling chamber, wherein the bands are placed around the bale. For permitting introduction of the boards into the compression chamber, the hopper 14 has an opening at one side, as at 50, which is normally closed by a door 52 pivoted adjacent the upper edge of the hopper, as at 54. The door is counterweighted by the arms and counterweights 56 and can readily be moved to the position indicated by the dot-dash outline when it is desired to place a board in the compression chamber.

It will be noted that the raising of the door to its dot-dash position also closes the hopper and prevents material from falling therefrom into the compression chamber. There is preferably provided a latch member 58, which engages beneath the lower edge of the door in its raised position and retains the door lifted until a trip solenoid E is energized. The latch arrangement is shown somewhat more in detail in Figure 4.

As mentioned before, the bales are tied or banded in the baling chamber by placing suitably strong bands thereabout and connecting the ends of the bands. There are usually two or three bands employed, and for materials which have been compressed to a high degree, the bands are preferably flat metal strips. According to this invention, means are provided for pushing the strips of metal through the baling chamber adjacent the compression chamber, so that the bands can be joined together before the bale is ejected from the machine.

The band inserting mechanism is best seen in Figures 2 and 3, wherein it will be noted that extending from one side of the frame 10 of the baling machine is another frame arrangement 60 which reciprocably supports a cross head 62. The cross head is connected with a plunger 64 reciprocable in a cylinder 69 which is rigidly supported on the frame 60. Conduits 66 and 68 supply fluid to opposite ends of the cylinder 69 for driving the plunger 64 in opposite directions therein.

Carried on the cross head 62 and extending therefrom toward the baling machine, are three bars or rods 70, the purpose of which is to thrust the tying bands across the compression chamber. The typing bands are preferably mounted on reels, of which one is shown at 72 on Figure 2. The bands lead from the reels over guide pulleys 74, and thence around the ends of bars 70. The bars 70, if desired, may have their ends slotted or may carry rollers in order to insure that the bands will not slip off.

When end boards are used at the ends of the bales, they are placed in the compression chamber with a divider board therebetween. The divider boards are provided free ways across their faces to permit the bars 70 to pass unobstructed across the baling chamber. The divider boards are preferably positively located within the baling chamber at this time by the latch members 76 pivoted on the sides of the baler and having their ends extending inwardly, as shown in Figure 2. These latch members are also effective for preventing rearward movement of the material being baled after it has been pushed from the compression chamber into the baling chamber.

The baling head 26 is provided with free ways, as indicated at 78 in Figure 1, and when the bars 70 are actuated, if end boards are not required on the bales, the baling head rests in its fully advanced position, and in which position its free ways are aligned with the said bars.

Hydraulic operating circuit

A typical hydraulic control circuit for controlling the supply of actuating fluid to the cylinders 28 and 69 is shown in Figure 5. In this figure, it will be noted that between the pump 40 and the cylinder 28 there is a control valve 80 which has an inlet port connected by conduit 82 with the discharge side of the pump, an exhaust port connected by conduit 84 with the reservoir 48 and two service ports connected with the conduits 42 and 44 leading to opposite ends of the cylinder 28. The valve 80 includes a valve bore having reciprocably mounted therein a valve member 86, which in its right-hand position connects conduit 82 with conduit 42, while connecting conduit 44 with conduit 84, and in its left hand position connects conduit 82 with conduit 44, while connecting conduit 42 with the exhaust conduit 84.

Valve member 86 is adapted for being moved to its right hand position by fluid supplied to the pilot 88 by pilot conduit 90 which leads to pilot valve 92. Similarly, valve member 86 is adapted for being moved to its left-hand position by a supply of fluid to pilot 94 from pilot conduit 96 which also leads to pilot valve 92.

Pilot valve 92 also has an exhaust connection to conduit 84 and a pressure connection by conduit 98 through a control valve 100 with conduit 102 leading to the discharge side of pump 40.

Pilot valve 92 has therein a rotatable valve member 104 which in one position connects pressure line 98 with pilot line 96 via the passage 106, while simultaneously connecting the exhaust line with pilot line 90 via passage 108. In its other position, the pilot valve interconnects pressure conduit 98 with pilot conduit 90 while connecting pilot conduit 96 with exhaust.

The pilot valve 92 is adapted for actuation into its two operative positions by reciprocation of the baling head. In Figure 2 it will be noted that the baling head carries a rod 110 having thereon a dog 112, and which is so positioned as to engage the actuating lever 114 of the pilot valve, in one direction of movement of the baling head. The head itself, or another dog on rod 110 may be employed to actuate lever 114 during movement of the head in the opposite direction. In Figure 5, the dog 112 is indicated as being supported by the plunger 34, but it will be understood that in the actual machine, the dog is carried by the baling head, as shown in Figure 2.

It will be apparent at this point that the plunger 34 will reciprocate continuously so long as there is a supply of pilot pressure delivered to the pilot valve. If it is desired to halt the plunger 34, the control valve 100 may be employed. This valve includes in addition to its connection with conduits 102 and 98, an exhaust connection represented by the conduit 116. A valve member 118 in the valve normally closes off the exhaust conduit and connects conduits 98 and 102. However, upon energization of the solenoid A, the valve member 118 is moved against its biasing spring 120 into position to close off conduit 102 and to connect conduits 98 and 116, thereby interrupting the supply of pilot fluid to the pilot valve 92 and preventing shifting of control valve member 86 when the plunger 34 reaches the end of its stroke.

The banding or tying ram 64 is controlled by a valve 122 which has an inlet port connected by conduit 124 with the pressure side of pump 40, has exhaust ports connected by conduit 126 with the reservoir 48, and service ports connected with conduits 66 and 68 that lead into opposite ends of cylinder 69. A valve member 128 in valve 122 is normally urged by spring 130 into position to connect conduit 66 with pressure conduit 124, while connecting conduit 68 with exhaust conduit 126. Energization of a solenoid B is operable to move valve member 128 into position to connect conduit 68 with pressure conduit 124, while interconnecting conduit 66 with exhaust conduit 126.

Electric control circuit of Figure 6

Figure 6 shows one form of electric control circuit for controlling the valves of Figure 5. In Figure 6, the power lines are indicated at L1 and L2, and one end of each of the valve solenoids A and B is connected together with the line L2 by a wire 140. One end of the door release solenoid E is also connected with line L2 as by the wire 142, and from wire 142 is a branch line 144 which connects with one end of each of a pair of relay solenoids C and D.

The other line L1 is connected with one terminal on a limit switch LS2, and the other terminal of which is connected with one terminal of limit switch LS1. The other terminal of switch LS1 is connected with one side of a push button switch 146 having a pair of normally closed contacts 148 and a pair of normally open contacts 150. The one of the contacts 148 opposite the limit switch LS1 is connected with the end of valve solenoid A opposite its connection to power line L2 as by the wire 152 and is also connected by the wire 154 with one of a pair of contacts 156 that are controlled by the relay C.

The one of the contacts 150 of switch 146 opposite the limit switch LS1 is connected by a wire 158 with one terminal of a limit switch LS5, the other terminal of which is connected by a wire 160 with the side of valve solenoid B opposite its connection with power line L2. A branch wire 162 leads from wire 158 to the end of relay coil D opposite its connection with wire 144 and also to one of a pair of contacts 164 controlled by relay D.

The other of contacts 164 is connected by wire 166 with one terminal of a limit switch LS7 the other terminal of which is connected by wire 168 with power line L1.

Relay D also controls a pair of contacts 170, one of which is connected by wire 172 with power line L1. The other of contacts 170 is connected by a wire 174 with one terminal of the limit switch LS4, the other terminal of which is connected by wire 176 with the end of solenoid E opposite its connection with 142. Wire 176 also leads to the end of coil C opposite its connection with wire 144 and to one terminal of limit switch LS6, the other terminal of which is connected with one of a pair of contacts 178 controlled by relay C. The other of the contacts 178 and the one of contacts 156 not connected with wire 154 are connected by wire 172 with power line L1.

The positioning of the aforementioned limit switches on the baling machine will be seen in Figures 1, 2, and 3. Limit switch LS1, as shown on the hopper in Figure 1, is a normally open switch which is closed when the hopper door is moved to its elevated position. Switch LS2 is shown in Figure 2 and is a normally open switch adapted for being closed when the baling head 26 is fully retracted and brings the cam 180 carried thereby against the operating arm of the switch. Limit switches LS4 and LS5 are also operated by movement of the baling head and for this purpose the baling head carries a rod supporting the switch operating dogs 113 which engage and close the switches LS4 and LS5 in succession as the baling head approaches the limit of its advancing movement.

Switches LS6 and LS7 are associated with the banding or tying ram, and are both normally closed. When the cross head 62 is in its Figure 3 position, it engages and holds open switch LS6. When the cross head 62 moves leftwardly in Figure 3 to its dot-dash position, it permits LS6 to close and engages and opens switch LS7. The manual switch 146 may be positioned on the side of the hopper, as shown in Figure 3, where it will be convenient for the operator to actuate.

Operation of the embodiment of Figures 1 through 6

Considering now the operation of the first embodiment of this invention, let it be considered that material is being supplied to the hopper 14 and the baling head reciprocated to compress the material in the compression chamber and to force it therefrom to the baling chamber. When a bale of the size desired has been built up, the operator raises the door 52, thereby halting further feeding of the material into the compression chamber. Raising of the door 52 closes limit switch LS1, and on the next following retraction stroke of the baling head 26, the limit switch LS2 is also closed.

Closing of both of these limit switches completes a circuit through manual switch 146, thereby completing a circuit through valve solenoid A. Energization of solenoid A shifts valve member 118 into position to connect conduit 98 to exhaust conduit 116 and thereby preventing supply of pressure fluid to the pilot areas of valve 80 when the baling head actuating plunger 34 completes its retracting movement and brings about shifting of the pilot valve 92. It will be evident that under these conditions, the plunger 34 will bottom in the head end of the cylinder 28 and hold baling head 26 fully retracted.

The operator now inserts through the opening in the top of the compression chamber a pair of end boards for the bales being made and a divider board therebetween.

After these boards have been inserted in the compression chamber, the operator depresses manual switch 146. Movement of switch 146 interrupts the circuit to A, and this releases the valve member 118 to return to its Figure 5 position wherein pressure is again supplied to pilot valve 92, and therefrom to the pilot areas of valve 80 so that this latter valve shifts and commences the plunger 34 on its advancing movement.

When switch 146 is actuated it also completes a circuit through relay solenoid D which pulls in and thereafter remains energized through its contacts 164, wire 166, limit switch LS7 and wire 168. Closing of D establishes a circuit to one side of each of limit switches LS4 and LS5 which are at this time open.

As the baling head 26 approaches the end of its advancing movement, the cams carried thereby close limit switches LS4 and LS5 in succession. Closing of LS4 completes a circuit through latch solenoid E which pulls latch 58 from beneath the edge of door 52 and permits it to again fall to its lower position. It is to be noted that the closing of door 52 again opens limit switch LS1, but that this is without effect at this time because relay D is being held through limit switch LS7. Closing of limit switch LS4 also completes an energizing circuit for relay coil C through wires 144, 176, 174, contacts 170 or relay D and wire 172. Relay C accordingly pulls in and again energizes valve solenoid A through wires 154, contacts 156, and wire 172. This again shifts valve member 118 to interrupt the supply of fluid to pilot valve 192, and when the baling head and its actuating plunger complete their advancing movement, the said plunger again bottoms in the cylinder 28 and holds the baling head stationary.

As the baling head is completing the last part of its forward movement, it engages and closes limit switch LS5 which completes a circuit through wire 180 to valve solenoid B. Energization of B shifts valve member 128 and brings about actuation of the banding plunger 64 to move its cross head 62 and the banding bars 70 leftwardly as viewed in Figure 3. At this time the aforementioned divider board is held in position by the baling head 26 so that free ways which are provided on the divider board are positioned for receiving the said bars 70.

When the cross head 62 commences its leftward movement it permits limit switch LS6 to close, and this completes a holding circuit for relay coil C through its contacts 178 and wire 172. When the cross head 62 reaches the limit of its left-hand travel, it engages and opens switch LS7, thereby interrupting the energizing circuit for relay D. This drops relay D out and breaks the energizing circuit for valve solenoid B, thereby permitting return of valve member 128 to its Figure 5 position, and it, in turn, causes retraction of plunger 64.

When plunger 64 has retracted and carries cross head 62 to its Figure 3 position, the said cross head again engages and opens limit switch LS6, thereby interrupting the energizing circuit for relay coil C. This drops C out and opens the energizing circuit for valve solenoid A. The de-energization of A permits return of the valve plunger 118 to its Figure 5 position, and again establishes a supply of pressure to the pilot valve 92 so that valve member 86 of valve 80 is shifted to cause the plunger 34, and the baling head again to commence their reciprocating movement.

The baling machine will now continue its operation, and another bale will be formed. The operator manually cuts the bands which have been thrust across the baling chamber by the bars 70 and connects one set of the ends so severed with the ends of the bands which had previously been thrust through at the leading edge of the bale being formed. This completes the formation of the bale, and it only remains for it to be ejected from the baling chamber by the formation of other bales by the machine.

Modification of Figures 7 and 8

Should it be desired to automatically measure the length of the bale being made, the measuring construction shown in Figure 8 may be employed in connection with the automatic control circuit shown in Figure 7.

In Figure 8 the plate at the upper side of the baling chamber is shown slotted as at 200. Vertically above this slot and mounted on the end of a swinging arm 202 is a wheel 204 comprising a center disk part and a plurality of segments 206 mounted thereon for radial adjustment. The peripheries of the segments 206 are serrated, and as they are adjusted inwardly and outwardly of the disk they present a different diameter to the top of the bale through the slot 200.

Pivotally mounted on the top plate of the baler adjacent the above-described measuring wheel is a plate 208 having thereon a limit switch LS8 adapted for being closed by a clockwise movement of an arm 210 pivoted on the plate and having an extension overlying the edge of disk 204. A cam member 212 on disk 204 engages arm 210 as the measuring wheel rotates and closes switch LS8. For a purpose which will be more apparent hereinafter, a solenoid S has its armature connected with plate 208 so that energization of S will shift the plate sufficiently to permit arm 210 to drop off its actuating cam 212.

Turning now to Figure 7, there is shown one form of electric control circuit adapted for use with the arrangement shown in Figure 8. In Figure 7, the above-mentioned limit switch LS8 will be seen to be connected in series with a limit switch LS9, a pair of normally closed contacts 214 and a relay solenoid F between the power lines L1 and L2. The limit switch LS9 corresponds to switch LS4 in Figure 6 and is adapted for being closed during the forward movement of the baling head.

It will be evident that closing of switch LS8 indicating that the proper length of the bale has passed beneath the measuring wheel, and closing of switch LS9, indicating that the baling head is nearing the end of its advancing stroke, will bring about energization of relay coil F. Energization of F closes its blade 216 and completes a circuit through valve solenoid A, which, as described previously, brings about halting of the baling head at the end of its advancing movement. Energization of F also closes its blade 218 and completes a circuit through blade 220 of relay G and valve solenoid B to one side of a limit switch LS10 which corresponds with limit switch LS5 of Figure 6. It will be evident that when the baling head completes its advancing movement and closes limit switch LS10, it will energize valve solenoid B and thereby actuate the banding plunger. When the banding plunger has completed its advancing movement, it engages and closes limit switch LS11, which corresponds with limit switch LS7 in Figure 6, except that LS11 is normally open, whereas LS7 is normally closed.

Closing of LS11 completes a circuit to the coil of relay G which pulls this relay in. The relay thereafter holds through its blade 222 and a normally closed limit switch LS12, which corresponds with LS2 of Figure 6. The closing of relay G opens blade 220 thereof and interrupts the energizing circuit to valve solenoid B, which brings about retraction of the banding plunger. When the banding plunger is fully retracted, it engages and closes a limit switch LS13 which corresponds to limit switch LS9 in Figure 6. Closing of LS13 completes a circuit through coil H which controls blade 224, bridging contacts 214 in the circuit of relay F, and blade 226 of relay G. Energization of H thus interrupts the energizing circuit for relay F permitting it to drop out and to de-energize valve solenoid A. This brings about shifting of valve 80 and starts the retraction movement of the baling head.

As the baling head approaches its fully retracted position, it engages and opens limit switch LS12, which interrupts the holding circuit for relay G and permits it to drop out. The control circuit is now returned to its original condition and will remain so until the measuring wheel again closes limit switch LS8. In order to prevent the possibility of limit switch LS8 remaining closed on the first stroke of the baling head following the banding of a bale, solenoid S is connected in parallel with relay coil H so that when switch LS13 closes, it also energizes S and moves plate 208 to disengage arm 210 from cam 212.

The modification shown in Figures 7 and 8 is thus fully automatic, with the baler continuing to operate and automatically banding the bales whenever they reach a predetermined size.

*Modification of Figures 9, 10 and 11*

As mentioned before, it is desired to operate the baler of this invention in conjunction with manufacturing processes in which there is a continuous flow of material to be baled. Inasmuch as the rate of flow of such material is variable under different conditions and with different manufacturing processes, it is desirable that the speed of operation of the baler be adjustable. Further, it is even more desirable that the baler automatically adjust its speed to accommodate to these changes in the rate of supply of the material thereto, so that it becomes an integral part of the manufacturing or processing equipment, and thus requires a minimum amount of attention.

For accomplishing these objects, the baler may be modified as shown in Figures 9 through 11. Figure 9 shows the hydraulic operating circuit wherein there is a low pressure high volume pump at P1 which is connected in parallel with a high pressure low volume pump P2. The low pressure pump discharges through a conduit 250 which includes the reverse flow check valve 252, unloading valve 254 and a variable restricting valve 256. The unloading valve 254 normally permits free flow of fluid from pump P1 therethrough. However, when the pressure at the discharge side of valve 254 exceeds a predetermined value, the valve 254 is piloted into position to bypass a portion of the low pressure discharge back to the reservoir to the conduit 258.

It will be seen that by adjusting the restricting valve 256, the rate at which pump P1 delivers actuating fluid to the baling press can be regulated. Inasmuch as the speed of operation of the baling press is largely determined by the rate of discharge from pump P1, the bleeding off of fluid from the discharge of this pump will vary the speed of operation of the press. At the same time, maximum pressures are still available from pump P2 so that there is no loss of power or baling capacity when the speed of the press is slowed down. Instead of the unloading valve 254, pump P1 can be by-passed by relief valve 262 which is set at the maximum pressure at which P1 is to operate, and which by-passes the said pump to the tank when its discharge pressure exceeds the setting of valve 262.

The restricting valve 256 can be manually adjusted, if desired, but it is preferred to make the speed adjustment of the baling machine responsive to the rate of material supply thereto. The valve is accordingly arranged for variation by a reversible motor M which drives the adjustable element of the valve through the worm and wheel arrangement at 264.

Figure 10 shows one manner in which the hopper of the baling machine can be arranged so the rate of material supply to the baler can be determined. In Figure 10 the hopper has a plurality of windows 270 in opposite walls thereof and arranged in transversely aligned pairs. Adjacent one each of these pairs of windows is a light source 272 and adjacent the other windows are the photocells 274 and 276 on which the beams of light from the light source fall. It is understood that suitable reflectors, lenses, and other collimating devices can be employed for defining the beams which fall on the photocells, but for the purposes of this disclosure, it is considered sufficient merely to indicate the light sources as light blubs.

The normal level of material in the hopper 14 is to be maintained as shown above the level of photocell 276 and below the level of photocell 274. Photocell 276 is thus normally dark, while photocell 274 is normally illuminated. This is utilized for effecting automatic control of motor M, as shown in Figure 11.

In Figure 11 the photocells 274 and 276 are shown operatively connected with a pair of power tubes 278 and 280 which, in turn, control a double throw relay 282 that has contacts connected with the motor M. In connection with photocell 274, the tube 278 is normally biased to discharge by the battery 284, but so long as the photocell is illuminated, current flows through the biasing resistor 286 from the battery 288 and off-sets the bias of battery 284. When the light beam to cell 275 is interrupted, the battery 284 prevails and tube 278 discharges by virtue of plate battery 279 through coil 290 of relay 282, thereby moving its armature 292 upwardly to complete an energizing circuit for motor M through battery 294 and switch 296. Switch 296 is controlled by a continuously rotating cam 298 which periodically interrupts the energizing circuit of motor M. This switch is provided for the purpose of preventing motor M from making any substantial overadjustment of the setting of valve 256.

Inasmuch as all material delivered to the hopper 14 falls through the light beam for cell 274, it is desirable to slow down the response of relay 290. One means for accomplishing this is represented by the tank coil 300 in the plate circuit of tube 278 and the condenser 302 which is shunted across coil 290. By a proper selection of these elements, the response of coil 290 to the interruption of the beam falling on cell 274 can be materially delayed, so that the feeding of material into the hopper 14 will not effect energization of motor M unless the amount of material in the hopper actually stands above cell 274.

Tube 280 and cell 276 are connected in a reverse manner to tube 278 and cell 274. Cell 280 is normally biased to cut off by battery 304, and as long as tube 276 is not illuminated, tube 280 does not discharge. However, when tube 276 is illuminated, a current flows therethrough and through biasing resistor 306 from battery 308, and the voltage drop across resistor 306 off-sets the bias of battery 304, and tube 280 commences to discharge to relay coil 310. It will be noted that relay coil 310 is immediately responsive to illumination of cell 276. When relay coil 310 is energized, it pulls armature 292 downwardly and energizes motor M to run in a direction which will increase the restriction of valve 256, and thereby slow down the baling machine.

During energization of relay coil 310, cam operated switch 296 is effective for periodically de-energizing motor M, thus preventing overadjustment of valve 256.

It will be apparent that the arrangement shown in Figures 9 through 11 operates for automatically controlling the speed of operation of the baler so that the level of material in the hopper 14 always falls between an upper limit represented by cell 274 and a lower limit represented by cell 276. The banding of the bales in this case would be carried out in accordance with the operation described in connection with the automatic control circuit of Figure 7.

From the foregoing it will be evident that I have invented a baling machine which is unique in a number of features. The baling machine according to my invention is hydraulically operated, has an automatic banding attachment, can be adjusted in speed, can be adapted for full automatic operation, and can also be adapted for automatic operation and automatic speed control so as to become an integral part of a continuous processing or manufacturing system. The control device which I have provided for the baler is positive and prevents any possibility that the machine attendant will be injured or that the machine will be harmed in any way by improper operation.

It will be understood that this invention is susceptible to modification in order to adapt it to different usages and conditions, and, accordingly, it is desired to comprehend such modifications within this invention as may fall within the scope of the appended claims.

I claim:

1. In a baling machine having a frame with a baling chamber and a compression chamber therein, a hopper opening vertically into said compression chamber from above, a baling head reciprocable through said compression chamber, one side wall of said hopper being hingedly supported along an upper edge so as to be movable into the hopper into position to interrupt the flow of material through said hopper and to expose said compression chamber, latch means for retaining said wall in its material interrupting position, fluid operated motor means for reciprocating said baling head, means responsive to the movement of said one wall to its material interrupting position for bringing about the halting of said baling head at the end of its next following retraction stroke, manual means selectively operable for releasing said head from its retracted position for movement in its advanced direction, and means operable following the operation of said manual means for releasing said latch to return said wall to its original position and also operable for halting said fluid operated motor means while maintaining pressure thereon in its fully advanced position.

2. In a baling machine having a reciprocable baling head and a fluid motor connected therewith for reciprocating the same, a hopper for supplying material to be baled to said machine and having one wall hingedly connected therewith for movement into material interrupting position, a source of fluid under pressure, a valve reversibly connecting said source with said motor, a pilot valve for controlling said valve, means operated by said baling head at opposite ends of its stroke for shifting said pilot valve, electrical means energizable for interrupting the supply of pressure to said pilot valve, and means operable in response to movement of said one wall into material interrupting position for bringing about energization of said electrical means during the next following retraction stroke of said baling head whereby the said head stops at the end of the said retraction stroke.

3. In a baling machine having a baling chamber and a compression chamber and a baling head reciprocable in said compression chamber, a fluid motor connected with said baling head, a hopper positioned above said compression chamber for supplying material to be baled thereto, a gate in said hopper movable into position to interrupt the flow of material therethrough, a source of fluid under pressure, a valve reversibly connecting said source with said motor, a pilot valve for controlling said first-mentioned valve and positioned to be engaged and shifted by said baling head at opposite ends of its stroke, means for supplying pilot pressure to said pilot valve, electrical means energizable for interrupting the supply of pressure fluid to said pilot valve, means responsive to the movement of said gate into material-interrupting position for energizing said electrical means on the next following retraction stroke of said baling head, and manual means for momentarily de-energizing said electrical means thereby to release said baling head from its retracted position and to bring about advancing movement thereof, said baling head halting in its advanced position following operation of said manual means.

4. In a baling machine having a baling chamber and a compression chamber and a baling head reciprocable in said compression chamber, a fluid motor connected with said baling head, a hopper positioned above said compression chamber for supplying material to be baled thereto, a gate in said hopper movable into position to interrupt the flow of material therethrough, a source of fluid under pressure, a valve reversibly connecting said source with said motor, a pilot valve for controlling said first-mentioned valve and positioned to be engaged and shifted by said baling head at opposite ends of its stroke, means for supplying pilot pressure to said pilot valve, electrical means energizable for interrupting the supply of pressure fluid to said pilot valve, means responsive to the movement of said gate into material interrupting position for energizing said electrical means on the next following retraction stroke of said baling head, manual means operable to de-energize said electrical means to bring about shifting of said valve to cause an advancing movement of said baling head, and means operable as the baling head approaches its advanced position following the operation of said manual means for again energizing said electrical means to halt the said baling head in its advanced position.

ROBERT E. SELTZER.

References Cited in the file of this patent

UNITED STATES PATENTS

| Number | Name | Date |
|---|---|---|
| 502,558 | Gest | Aug. 1, 1893 |
| 893,830 | Young | July 21, 1908 |
| 1,237,495 | Ezell | Aug. 21, 1917 |
| 1,290,203 | Houk | Jan. 7, 1919 |
| 2,037,211 | Campbell | Apr. 14, 1936 |
| 2,068,886 | MacDonald | Jan. 26, 1937 |
| 2,158,745 | Dalimata | May 16, 1939 |
| 2,220,798 | Dinzl | Nov. 5, 1940 |
| 2,293,679 | Barker | Aug. 18, 1942 |
| 2,396,720 | Nolt | Mar. 19, 1946 |
| 2,400,555 | Johnston | May 21, 1946 |
| 2,476,672 | Martin | July 19, 1949 |
| 2,593,569 | Kelley | Apr. 20, 1952 |

FOREIGN PATENTS

| Number | Country | Date |
|---|---|---|
| 113,746 | Australia | Aug. 22, 1941 |
| 604,358 | France | Jan. 25, 1926 |